Sept. 19, 1967 J. F. LASKIEWICZ 3,342,917
METHOD FOR PRESSURE MOLDING POWDERED MATERIAL
Filed March 15, 1965 2 Sheets-Sheet 1

INVENTOR.
John F. Laskiewicz.
BY
Charles W. Gregg
AGENT

Sept. 19, 1967 J. F. LASKIEWICZ 3,342,917
METHOD FOR PRESSURE MOLDING POWDERED MATERIAL
Filed March 15, 1965 2 Sheets-Sheet 2

INVENTOR.
John F. Laskiewicz.
BY
Charles W. Gregg
AGENT

United States Patent Office 3,342,917
Patented Sept. 19, 1967

3,342,917
METHOD FOR PRESSURE MOLDING POWDERED MATERIAL
John F. Laskiewicz, Painted Post, N.Y., assignor to Corning Glass Works, Corning, N.Y., a corporation of New York
Filed Mar. 15, 1965, Ser. No. 439,591
2 Claims. (Cl. 264—109)

ABSTRACT OF THE DISCLOSURE

A method for pressure molding powdered material to form an article having a wire extending therethrough, by supplying powdered material to a mold cavity, projecting a wire through a hollow first punch into an opening within an inner punch vacated by a moving core pin within, removing the inner punch from the mold cavity, and then moving the first punch, the inner punch and an outer punch toward each other to mold the material about the wire.

The present invention relates to a method for pressure forming or molding powdered materials into articles or parts. More particularly the invention relates to a method for forming powdered or granular materials into compressed articles or parts each having at least one wire extending therethrough. Still more specifically the present invention relates to a method for pressure forming a pulverized material, such as powdered glass or glass frit, to form insulating parts having one or more wires extending therethrough, such parts being useful, for example, in the manufacture of electron or vacuum tubes and the like.

The pressure forming of articles from granular or powdered material by the use of dies is, of course, old and well known. However, the pressure forming of powdered materials into insulating articles having one or more wires provided therethrough prior to the forming of such articles, and thereafter formed as a part of such article, is believed to be a new development in the art. It is accordingly an object of the present invention to provide a new and novel method for pressure forming articles of the type mentioned.

It is another object of the present invention to provide a method of pressure forming articles having wires or wire leads extending therethrough.

Other objects and characteristic features of the invention will become apparent as the description proceeds.

Figure 1:
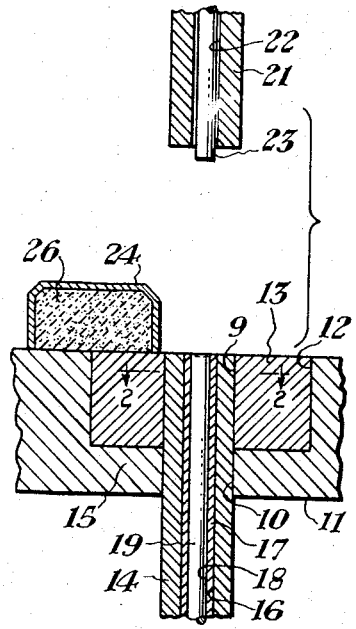
Figure 2:
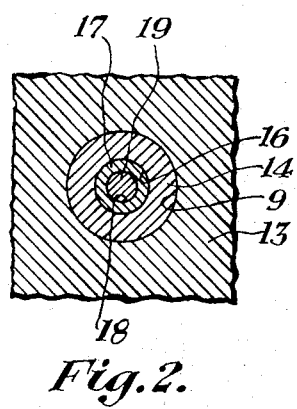

The invention will best be understood with reference to the accompanying drawings in which:

FIG. 1 is a side elevational view, partially in cross section, of a die embodying the invention;

FIG. 2 is a top cross sectional view on an enlarged scale of a part of the die of FIG. 1 taken substantially along line 2—2 of FIG. 1; and FIGS. 3 through 9 illustrate the steps of the method of the present invention in employing the die, illustrated in FIGS. 1 and 2, in forming an article having a wire or wire lead extending therethrough.

Similar reference characters refer to similar parts in each of the drawing figures.

Referring to the drawings in detail, there is shown in FIGS. 1 and 2 a horizontally disposed base plate or support member 11 having an opening comprising a first portion 12 extending down to a shoulder 15 in said support member and a second smaller portion 10 extending downwardly through shoulder 15 and through the bottom of the support member or base plate 11. A matrix member 13 of a die is supported in the first portion 12 of said said opening in base plate 11, the bottom surface of such matrix member resting upon shoulder 15. Matrix member 13 includes an opening 9 extending vertically and completely therethrough and providing a molding chamber or cavity in which articles are formed as hereinafter discussed. The opening 9 through matrix member 13 corresponds to portion 10 of the opening extending through base plate 11, as is readily apparent from a brief glance at FIG. 1 of the drawings.

The die further includes a first lower punch 14 having an opening 16 extending longitudinally therethrough and shown as concentric therewith. A second lower punch 17 snugly but slidably extends through opening 16 in punch 14 and is provided with an opening 18 extending longitudinally therethrough and illustrated as concentric therewith. A core pin 19 snugly but slidably extends through opening 18 provided in lower punch 17. The concentric arrangement of the first and second lower punches 14 and 17, and the core pin 19, is readily understood from a glance at FIG. 2 of the drawings. In the normal condition of the die as illustrated in FIG. 1, said punches and core pin extend upwardly through the portion 10 of the opening in base plate 11 and the opening 9 in matrix member 13, the lower punch 14 fitting snugly but slidably within such openings.

An upper punch 21 is normally disposed in a spaced relationship above opening 9 in matrix member 13 and may, as hereinafer discussed, be snugly and slidably projected into such opening. Punch 21 has an opening 22 extending substantially longitudinally therethrough and illustrated as concentric therewith. Such opening 22 corresponds with and is complemental to the opening 18 in the second or inner lower punch 17. A wire or piece of wire 23 is provided and is projected downwardly through opening 22 in upper punch 21, the lower end of such wire normally extending slightly beyond the lower face of such punch. It is pointed out that openings 18 and 22 in punches 17 and 21, respectively, cross-sectionally correspond to the cross-section of the wire 23 which may be somewhat easily projected or slid through such openings.

There is shown resting upon the top surface of base plate 11 an open-bottomed container 24 to which is periodically supplied a quantity of powdered material 26 to be used in the pressure forming of a compressed article such as 26a (FIG. 7) having a wire such as 23a (FIG. 8) extending therethrough. As will be understood from the operational example hereinafter set forth, wire or wire lead 23a comprises a cut-length of wire 23, and article 26a comprises an article formed from the powdered material 26 which is initially supplied to container 24 and is thereafter supplied to the opening or mold chamber 9 in matrix member 13.

It is believed expedient to point out at this time that punches 14, 17 and 21, and core pin 19 are separately vertically actuable into and through the opening 9 in matrix member 13 to compress a quantity or charge of the powdered material 26 supplied to such opening. However, the means per se for so actuating said members and core pin comprise no part of the present invention and, therefore, are not shown in the drawings for purpose of simplification thereof. Means or apparatus for actuating said members to pressure form an article such as 26a from the powdered material such as 26 will be readily apparent or are well known to those skilled in the art and may, for example, comprise fluid pressure cylinders and associated pistons individually connected to the punches and to the core pin.

Referring now to FIGS. 1, and 3 through 9 of the drawings, the steps of the inventive method disclosed herein for pressure forming an article from powdered material will be discussed.

The parts of apparatus will be assumed to be in their normal positions as illustrated in FIG. 1 of the drawings and a charge or supply of the powdered material 26 to be formed is supplied to container 24 in any convenient manner. Such powdered material may, for example, comprise a mixture of powdered glass or glass frit, and a binder or agglutinant which is normally solid at room temperature, which may be flowed under pressure, and which later may be driven off or volatilized by heat. Examples of binders or agglutinants which may be employed are bees wax, gum arabic, paraffin, or the like.

Figure 3:
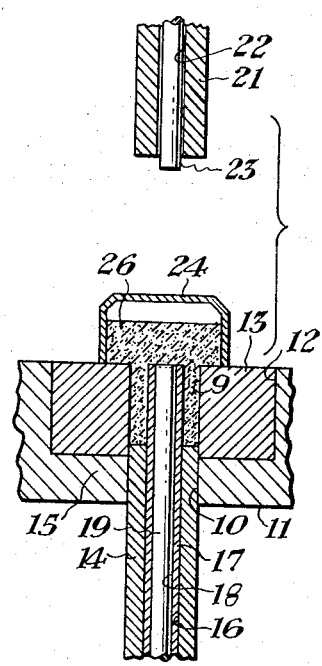

Referring to FIG. 3, punch 14 is partially withdrawn from opening or mold chamber 9 in matrix 13 to partially vacate such chamber for receipt therein of a quantity of the mixture 26 in container 24. Prior to, simultaneous with, or subsequent to said withdrawal of punch 14, container 24 is slid over the upper end of opening or mold cavity 9 and such partially vacated mold chamber or cavity is filled with the material 26. It is pointed out that the use of a container such as 24 for supplying material 26 to the mold cavity is not critical to the invention but such material can be supplied thereto in various other obvious fashions.

Figure 4:
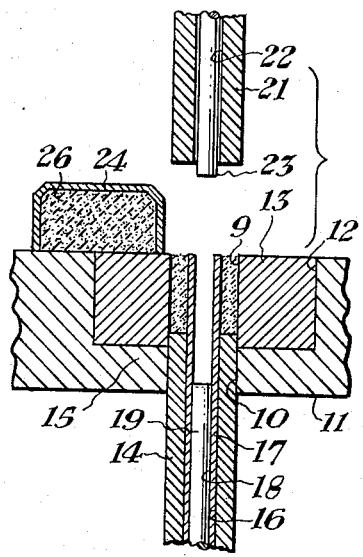
Figure 5:
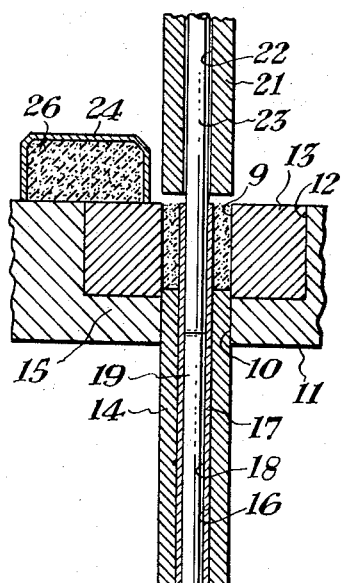
Figure 6:
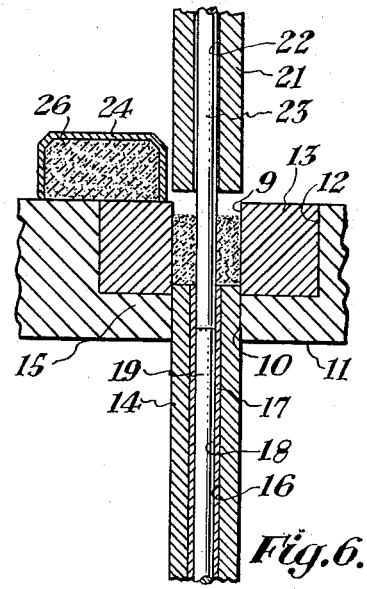
Figure 7:
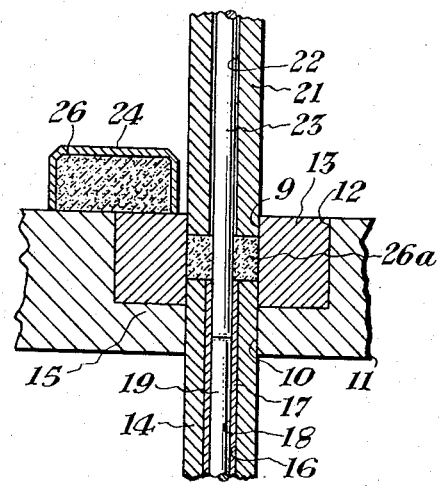

Following the filling of the partially vacated mold cavity 9, container 24 is moved to its original position shown in FIG. 1 and core pin 19 is partially withdrawn from the opening 18 extending through punch 17, as shown in FIG. 4. Prior to, simultaneously with, or following said withdrawal of core pin 19, upper punch 21 is lowered so that its lower face is adjacent the upper end of opening 9, and wire 23 is projected downwardly through the opening 22 in punch 21 and into the space in punch 17 vacated by the withdrawal of core pin 19 (FIG. 5). As illustrated in FIG. 6, punch 17 is now partially withdrawn from opening or mold chamber 9 in matrix 13 and the material 26 is permitted to settle around that part of wire 23 uncovered by said withdrawal of punch 17. Punch 21 is now moved down into the upper end of mold cavity 9 while punches 14 and 17 are again moved upwardly within such cavity. The actuating means for such punches are selected so as to be capable of supplying considerable pressure to the material 26 in the mold cavity 9 and thereby compact or compress such material to cause the grains of the mixture of which such material is comprised to cohere into a relatively solid mass and form the article 26a within the mold cavity and around the wire 23 extending therethrough.

Figure 8:
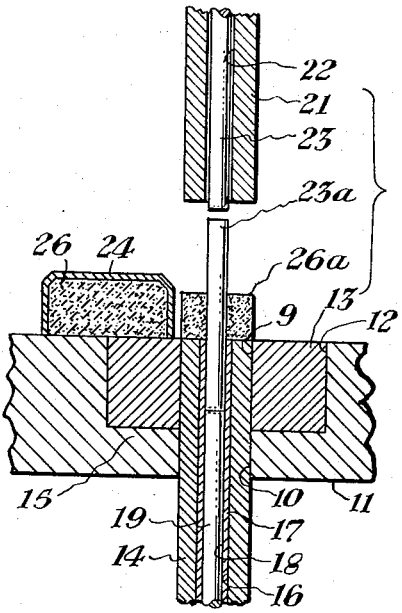

As illustrated in FIG. 8, following the pressure forming of the article 26a, punch 21 is withdrawn from the mold cavity 9, and punches 14 and 17 and core pin 19 are again moved upwardly through such cavity to eject article 26a, and the wire incorporated therein, from said opening or mold cavity. Wire 23 is then cut as shown in FIG. 8 thereby leaving the wire lead or length of wire 23a incorporated in and extending through the molded article. Thereafter, punch 21 and the remaining wire 23 are further retracted or withdrawn to their normal positions. It is pointed out that the step of cutting wire 23, to segregate the wire lead or length of wire 23a therefrom, is not critical since a series of lengths of wire, each corresponding to the wire lead 26a, rather than a substantially continuous length of wire, as from a reel thereof, may be fed or projected through opening 22 in punch 21.

Figure 9:
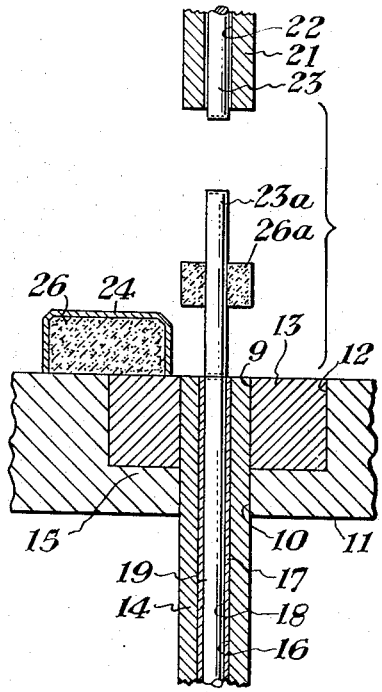

Subsequent to the cutting of wire 23, and the further retraction of punch 21 and wire 23 as discussed above, core pin 19 is further projected through the opening 18 in punch 17 as illustrated in FIG. 9, and the bottom part of the wire lead 23a is thereby ejected from such opening. The die members and associated apparatus are now again in their normal condition as illustrated in FIG. 1, and container 24 can again be slid over the top surface of base plate or support member 11 to supply another charge of material 26 to mold cavity 9 in preparation for forming another article such as 26a, such movement of container 24 also pushing away the previously formed article 26a to clear the die members and associated apparatus. It is readily apparent that a new quantity or charge of material 26 can be supplied to container 24 at any time, in each sequence of forming operations, following the return of such container to its normal position as illustrated in FIG. 4, that is, at any time during the steps discussed in relation to FIGS. 4 through 9 of the drawings.

At some time subsequent to the forming of each article such as 26a, each such part is baked or fired, either singly or in quantities, to burn or drive out the binder employed therein and to fuse the remaining compressed powdered material into a substantially homogeneous article having a configuration conforming to the shape of the molding cavity in which it was pressure formed and having at least one lead such as 23a extending therethrough. Although the mold cavity 9 in matrix member 11 is illustrated in FIGS. 1 and 2 of the drawings as having a circular configuration, it will be readily obvious to those skilled in the art that such cavity could as well be triangular, square, or otherwise multisided, to form articles such as 26a but having other than circular shape and having a wire extending therethrough. Furthermore, it is well within the scope of the invention to provide more than one wire extending through a formed article such as 26a, such restults being accomplished by providing additional complemental wire receiving openings extending through the upper and lower punches of the die and a core pin for each such opening in the lower punches.

Although there is herein shown and discussed only one form of apparatus for and method of practicing the present invention, it will be understood that various changes and modifications may be made therein without departing from the spirit and scope of the appended claims.

What is claimed is:

1. The method of molding powdered material to form a part having a wire extending therethrough, such method comprising, providing a die including a matrix member having a molding chamber extending therethrough, a first punch facing one end of said molding chamber and second and third concentric punches facing the other end of said chamber, said first and third punches having identical openings extending longitudinally therethrough; projecting a core pin through the opening in said third punch to fill such opening, projecting said second and third punches through said molding chamber to fill such chamber, partially withdrawing said second punch from said molding chamber and from about said third punch and filling the space vacated by such withdrawal of the second punch with said powdered material, partially withdrawing said core pin from the opening in said third punch and projecting a length of wire through the opening in said first punch and into the space vacated by such withdrawal of the core pin, partially withdrawing the third punch from said molding chamber and from about said wire to permit said powdered material in such chamber to settle around the wire, projecting said first punch into said one end of the molding chamber and moving such punch and said second and third punches toward each other within said chamber to compress and mold the material in said chamber to the contours of such chamber and to the part of said wire surrounded by such material, withdrawing said first punch from said chamber; projecting said second third punches further into said chamber to eject and partially eject, respectively, from such chamber the molded part and the wire extending through such part; and projecting said core pin further into said opening in said third punch to complete the ejection of said wire from such opening and from the molding chamber and thereby preparing said die for the similar molding of another part.

2. In a method of molding powdered material to form parts having wires extending therethrough, in which a matrix having an opening extending therethrough is provided, a first punch having an opening extending therethrough is provided for one end of said matrix opening, second and third concentric punches are provided for the other end of said matrix opening, such second and third punches extending partially and completely through the matrix opening respectively, and the third punch having an opening extending therethrough, and a core pin is provided and slidably extends through the opening in said third punch, the steps of filling the space within said matrix opening and surrounding said third punch with said powdered material, withdrawing said core pin from the opening in said third punch to provide a space for receipt of said wire, projecting a length of said wire through the opening extending through said first punch and into the space provided in said third punch by the withdrawal of said core pin, withdrawing said third punch from about part of the length of said wire projected therein to expose such part of such wire and to permit said material to settle about such exposed part, projecting said first punch into said matrix opening and moving such punch and the second and third punches toward each other through such opening to compress and mold the powdered material supplied thereto to form one of said parts, withdrawing the first punch from the matrix opening and projecting said second and third punches through such opening to eject the molded part therefrom, and projecting said core pin through the opening extending through said third punch to eject said wire therefrom and complete the ejection of the molded part, thereby preparing for another series of steps and the formation of another part.

References Cited

UNITED STATES PATENTS

| | | | |
|---|---|---|---|
| 722,702 | 3/1903 | Hanks | 18—36 |
| 2,127,994 | 8/1938 | Davis et al. | 264—109 |
| 2,325,687 | 8/1943 | Kux | 25—90 |
| 2,509,783 | 5/1950 | Richardson. | |
| 2,855,630 | 10/1958 | Veley | 18—36 |
| 3,209,057 | 9/1965 | Lassman | 264—109 |

ROBERT F. WHITE, *Primary Examiner.*

J. R. HALL, *Assistant Examiner.*